(12) United States Patent
Byun et al.

(10) Patent No.: US 8,073,341 B2
(45) Date of Patent: Dec. 6, 2011

(54) METHOD AND SYSTEM FOR CONTROLLING DRIVING CURRENT OF WDM-PON OPTICAL TRANSMITTER

(75) Inventors: Jae Oh Byun, Chungcheongnam-do (KR); Kyoung Min Kim, Seoul (KR)

(73) Assignee: Luxpert Technologies Co., Ltd. (KR)

( * ) Notice: Subject to any disclaimer, the term of this patent is extended or adjusted under 35 U.S.C. 154(b) by 414 days.

(21) Appl. No.: 12/516,920

(22) PCT Filed: Mar. 24, 2008

(86) PCT No.: PCT/KR2008/001652
§ 371 (c)(1),
(2), (4) Date: May 29, 2009

(87) PCT Pub. No.: WO2009/051313
PCT Pub. Date: Apr. 23, 2009

(65) Prior Publication Data
US 2010/0067921 A1    Mar. 18, 2010

(30) Foreign Application Priority Data
Oct. 17, 2007    (KR) .................. 10-2007-0104356

(51) Int. Cl.
*H04B 10/04* (2006.01)
(52) U.S. Cl. ......... 398/196; 398/195; 398/192; 398/182

(58) Field of Classification Search .................. 398/196, 398/195, 192, 182
See application file for complete search history.

(56) References Cited

U.S. PATENT DOCUMENTS

| 2004/0101305 A1* | 5/2004 | Jung et al. ........................ 398/71 |
| 2004/0208208 A1* | 10/2004 | Shin et al. ........................ 372/32 |
| 2006/0140548 A1* | 6/2006 | Shin et al. ........................ 385/89 |
| 2007/0081823 A1* | 4/2007 | Lee et al. ........................ 398/79 |

* cited by examiner

*Primary Examiner* — Kinam Park
(74) *Attorney, Agent, or Firm* — Cantor Colburn LLP (57) ABSTRACT

The present disclosure relates to a WDM-PON (wavelength division multiplexed-passive optical network) optical transmitter; and, more particularly, to a system for controlling driving current of the WDM-PON optical transmitter. The present disclosure provides a driving current control method of the optical transmitter for in use in the WDM-PON, including: setting an attenuation value of a variable optical attenuator to X; detecting an optical power Px received by a monitoring photo diode of the optical transmitter; setting an attenuation value of the variable optical attenuator to Y; detecting an optical power Py received by the monitoring photo diode of the optical transmitter; calculating an optical power Pout of an optical signal outputted from a common terminal of a 1×N optical multiplexer/demultiplexer based on the detected optical power Px and Py; and controlling a driving current based on the calculated optical power Pout.

8 Claims, 6 Drawing Sheets

METHOD AND SYSTEM FOR CONTROLLING DRIVING CURRENT OF WDM-PON OPTICAL TRANSMITTER

TECHNICAL FIELD

The present disclosure relates to a WDM-PON (wavelength division multiplexed-passive optical network) optical transmitter; and, more particularly, to a system for controlling driving current of the WDM-PON optical transmitter.

BACKGROUND ART

A wavelength division multiplexed-passive optical network (WDM-PON) provides a high speed broadband communication service by using an inherent wavelength assigned to each subscriber. Accordingly, each subscriber receives a signal having a different wavelength corresponding thereto, so that a security is enhanced and a separate communication service is provided to each subscriber, thereby enlarging a communication capacity.

Conventionally, a method has been proposed wherein a central office and a subscriber terminal have a respective light source including a distributed feedback-laser diode (DFB-LD) element, thereby realizing the WDM-PON.

However, such method has problems that the DFB-LD element is expensive and a temperature control technique is complicated.

Accordingly, a technique using a wavelength-locked optical signal has been widely used by injecting an incoherent light source into a Fabry-Perot Laser Diode (FP-LD) of a low price, thereby implementing an injection-locked WDM optical signal.

Figure 1:
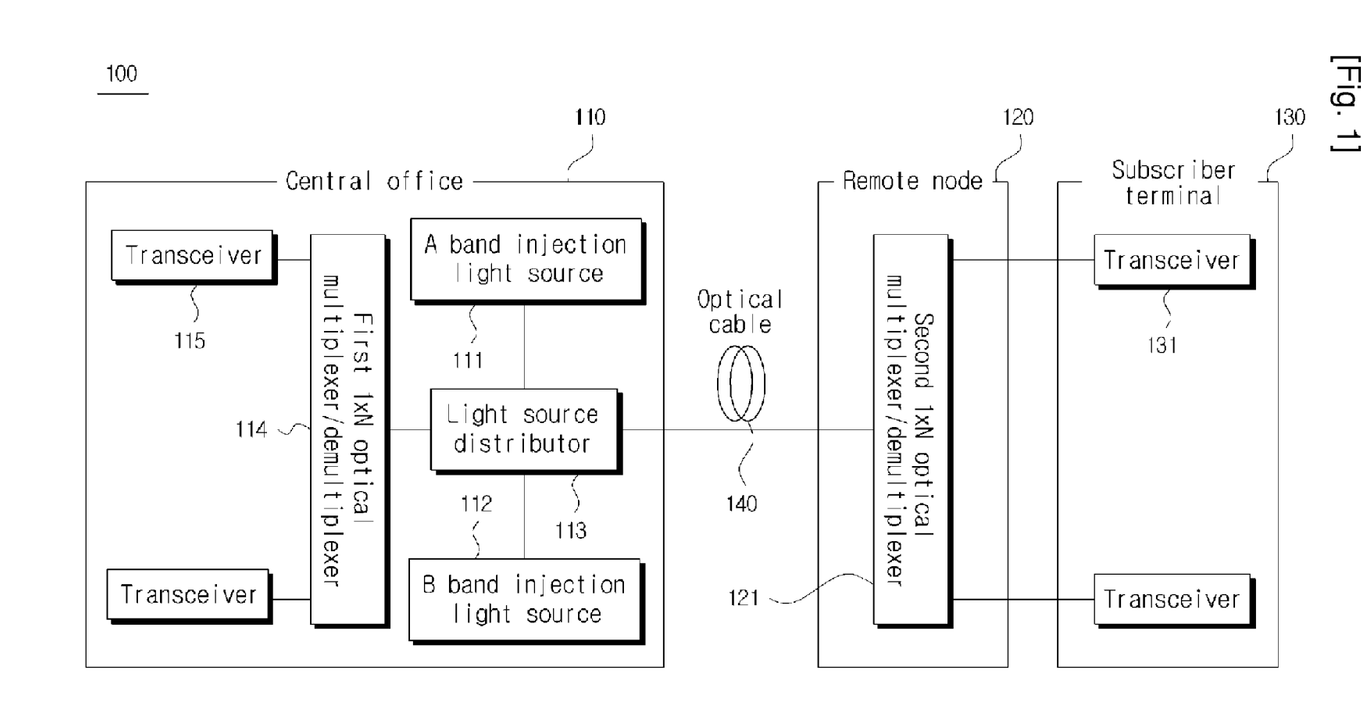
FIG. 1 is a diagram for explaining a bidirectional communication in a WDM-PON in accordance with the prior art.

Hereinafter, a configuration of a conventional wavelength division multiplexed-passive optical network 100 will be described in reference to FIG. 1. FIG. 1 shows a schematic block diagram for showing a conventional bidirectional communication in an injection-locked wavelength division multiplexed-passive optical network.

The injection-locked wavelength division multiplexed-passive optical network 100 includes a central office 110, a subscriber terminal 130, a remote node 120 for connecting the central office 110 with each subscriber terminal 130 and an optical cable 140.

The central office 110 has an A band injection light source 111, a B band injection light source 112, a light source distributor 113, a first 1×N optical multiplexer/demultiplexer 114 and a multiplicity of transceivers 115.

The remote node 120 has a second 1×N optical multiplexer/demultiplexer 121 and the subscriber terminal 130 has a plurality of transceivers 131.

The A band injection light source 111 is provided as a light source for an A band optical signal serving as a downstream optical signal. As the A band injection light source 111, an incoherent light source may be mainly used. The A band injection light source 111 generates the A band injection optical signal, and then transmits it to the light source distributor 113.

The B band injection light source 112 is provided as a light source for B band optical signal serving as an upstream optical signal, and, like the A band injection light source 111, an incoherent light source may be mainly used as the B band injection light source 112. The B band injection light source 112 generates the B band injection optical signal, and then transmits it to the light source distributor 113.

The light source distributor 113 receives the A band injection optical signal from the A band injection light source 111 and transmits it to the first 1×N optical multiplexer/demultiplexer 114 of the central office 110. Further, the light source distributor 113 receives a wavelength-locked A band optical signal from the first 1×N optical multiplexer/demultiplexer 114 of the central office 110 and transmits it to the optical cable 140 connected to the remote node 120.

In addition, the light source distributor 113 receives the B band injection optical signal from the B band injection light source 112 and transmits it to the second 1×N optical multiplexer/demultiplexer 121 of the remote node 120 through the optical cable 140. Further, the light source distributor 113 receives a wavelength-locked B band optical signal from the second 1×N optical multiplexer/demultiplexer 121 of the remote node 120 and transmits it to the first 1×N optical multiplexer/demultiplexer 114 of the central office 110.

The first 1×N optical multiplexer/demultiplexer 114 separates the A band optical signal received from the light source distributor 113 according to the wavelength thereof, and then, injects it to each transmitter of the transceivers 115 of the central office 110. For example, as the first 1×N optical multiplexer/demultiplexer 114, an arrayed waveguide grating (AWG) may be used.

As the transmitter of the transceivers 115, the Fabry-Perot Laser Diode (FP-LD) may be used and the transmitter generates the downstream optical signal to be transmitted to each subscriber.

Specifically, if the A band injection optical signal separated based on the wavelength thereof is injected to each transmitter of the transceivers 115, wavelength elements having a wavelength different from that of the injected optical signal are suppressed and wavelength elements having a wavelength equal to that of the injected optical signal is locked, thereby outputting the wavelength-locked A band downstream optical signal.

Each receiver of the transceivers 115 receives a wavelength-locked B band upstream optical signal from the subscriber terminal 130, and then, converts it into an electrical signal. A photo diode (PD) may be used as the receiver of the transceivers 115.

The second 1×N optical multiplexer/demultiplexer 121 of the remote node 120 separates the B band optical signal received from the light source distributor 113 based on the wavelength thereof, and then, injects it to the transceivers 131 of the subscriber terminal 130. The arrayed waveguide grating (AWG) may be used as the second 1×N optical multiplexer/demultiplexer 121 like the first 1×N optical multiplexer/demultiplexer 114.

The Fabry-Perot Laser Diode (FP-LD) may be used as the transmitter of the transceivers 131, for example, and the transmitter generates an upstream optical signal to be transmitted to the central office 110.

Specifically, if the B band injection optical signal separated according to the wavelength thereof is injected to the transmitter of the transceivers 131, wavelength elements having a wavelength different from that of the injected optical signal are suppressed and wavelength elements having a wavelength equal to that of the injected optical signal is locked, thereby outputting the wavelength-locked B band upstream optical signal.

Each receiver of the transceivers 131 receives the wavelength-locked A band downstream optical signal from the central office 110, and then, converts it into an electrical signal. A photo diode (PD) may be used as the receiver of the transceivers 131.

As described above, the transmitter for use in the wavelength division multiplexed-passive optical network (WDM-PON) outputs an optical signal including data.

Figure 2:
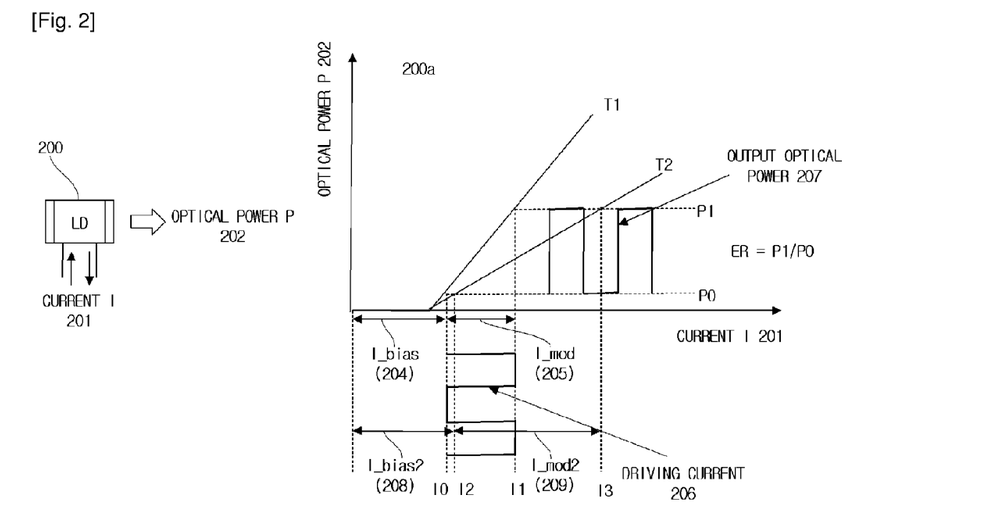
FIG. 2 depicts characteristics of a laser diode LD used in an optical transmitter.

FIG. 2 depicts characteristics of a laser diode LD used in an optical transmitter.

The laser diode LD 200 generates an optical signal having an optical power P 202 according to a current I 201 applied from a driving circuit (not shown). The laser diode LD 200 is, for example, a diode that generates an optical signal by using a forward semiconductor junction as an active medium, and a material thereof may be GaAs or the like.

The optical power P 202 of the optical signal generated by the laser diode LD 200 has a relationship shown as a graph 200a in FIG. 2 with respect to the current I 201 applied to the laser diode LD 200. That is, the optical power P 202 has a value of 0 in a case that the current I 201 is under the value of a threshold current. However, when the current I 201 exceeds the value of the threshold current, the optical power P 202 increases in proportion to the current I 201.

The laser diode LD 200 receives a driving current 206 and generates an optical signal having an output optical power 207 according to the relationship between the current I 201 and the optical power P 202 shown in the graph 200.

Therefore, when the temperature is T1, the laser diode LD 200 generates an optical signal having an output optical power of P0 if it receives a current I0, and generates an optical signal having an output optical power of P1 if it receives a current I1.

In other words, when the temperature is T1, a bias current I_bias1 204 of the laser diode is I0, and a modulation current I_mod1 205 thereof is I1-I0.

However, the laser diode LD 200 generates optical signals having different optical powers with respect to an identical driving current depending on surrounding environment, such as the variation of the temperature or the deterioration of the laser diode LD.

For example, when the temperature is T1 as described above, the laser diode LD 200 generates optical signals having the optical powers P0 and P1 in case of receiving I0 and I1, respectively. However, when the temperature is T2, I2 and I3 need to be applied to the laser diode LD 200 instead of I0 and I1 as a driving current so as to generate optical signals having the output optical powers P0 and P1, respectively.

That is, when the temperature is T2, a bias current I_bias2 208 and the modulation current I_mod2 209 of the laser diode LD 200 are I2 and I3-I2, respectively.

Thus, the laser diode LD 200 should be applied with driving currents having different values depending on the surrounding environment such as temperature in order to generate identical output optical powers.

Figure 3:
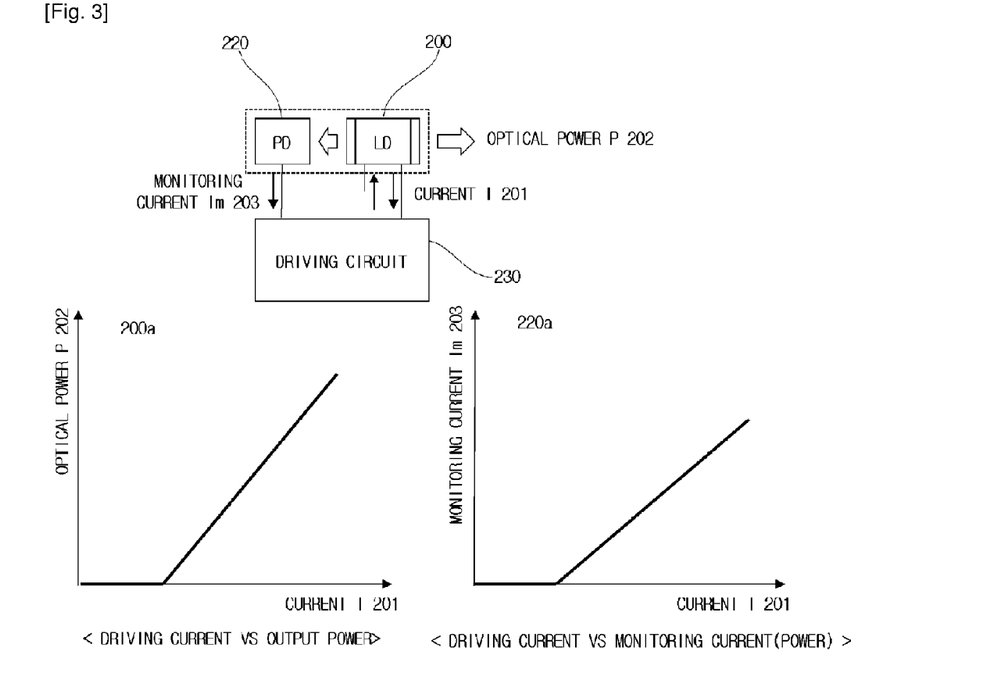
FIG. 3 shows a configuration of a conventional optical transmitter, a relationship between a driving current and an optical power and a relationship between the driving current and a monitoring current.

Accordingly, an optical transmitter that detects an optical signal outputted from the back facet of the laser diode and calculates the value of the driving current to be applied thereto according to the detected optical signal has been conventionally used. FIG. 3 shows a configuration of a conventional optical transmitter, a relationship between a driving current and an optical power and a relationship between the driving current and a monitoring current.

The conventional optical transmitter that controls the driving current includes a laser diode LD 200, a photo diode PD 220 and a driving circuit 230.

The back facet of the laser diode LD 200 is coated with a material that has a high reflectivity. Thus, most of the optical signal generated by the laser diode LD 200 is outputted through a front facet thereof, while a very small amount of the optical signal is outputted to the back facet thereof. At this time, the optical power of the optical signal outputted from the back facet of the laser diode LD 200 is proportional to that outputted from the front facet thereof.

The photo diode PD 220 receives the optical signal outputted from the back facet of the laser diode LD 200 and then converts the received optical signal into a monitoring current Im 203. The converted monitoring current Im 203 is proportional to the optical power of the optical signal received by the photo diode PD 220, and the photo diode PD 220 transmits the monitoring current Im to the driving circuit 230.

The driving circuit 230 receives the monitoring current Im 203 from the photo diode PD 230, and calculates the optical power of the optical signal outputted from the front facet of the laser diode LD 200 based on the received monitoring current Im 203. Then, the driving circuit 230 controls the value of the driving current I 201 that needs to be applied to the laser diode LD 200 based on the calculated optical power. The laser diode LD 200 generates an optical signal according to the controlled driving current I 201.

The relationship between the driving current I 201 and the optical power P 202 is shown in the graph 200a, and the relationship between the driving current I 201 and the monitoring current Im 203 is shown in the graph 220a. As shown in the graphs 200a and 220a, the optical power of the optical signal actually outputted from the front facet of the laser diode LD 200 is in proportion with the monitoring current Im 203 outputted from the photo diode PD 220.

In the meantime, it is required that an average power and an extinction ratio ER(=P1/P0) of an optical signal received by an optical receiver are controlled to fall within a predetermined range in order to accomplish an optimal performance in the wavelength division multiplexed-passive optical network (WDM-PON) as well as in a general optical transmission system. Accordingly, the driving circuit 230 performs automatic power control (APC) and automatic ER control (AEC) based on the monitoring current Im, so that a bias current and a modulation current are adjusted until the average power and the extinction ratio ER fall within a desired range.

Figure 4:
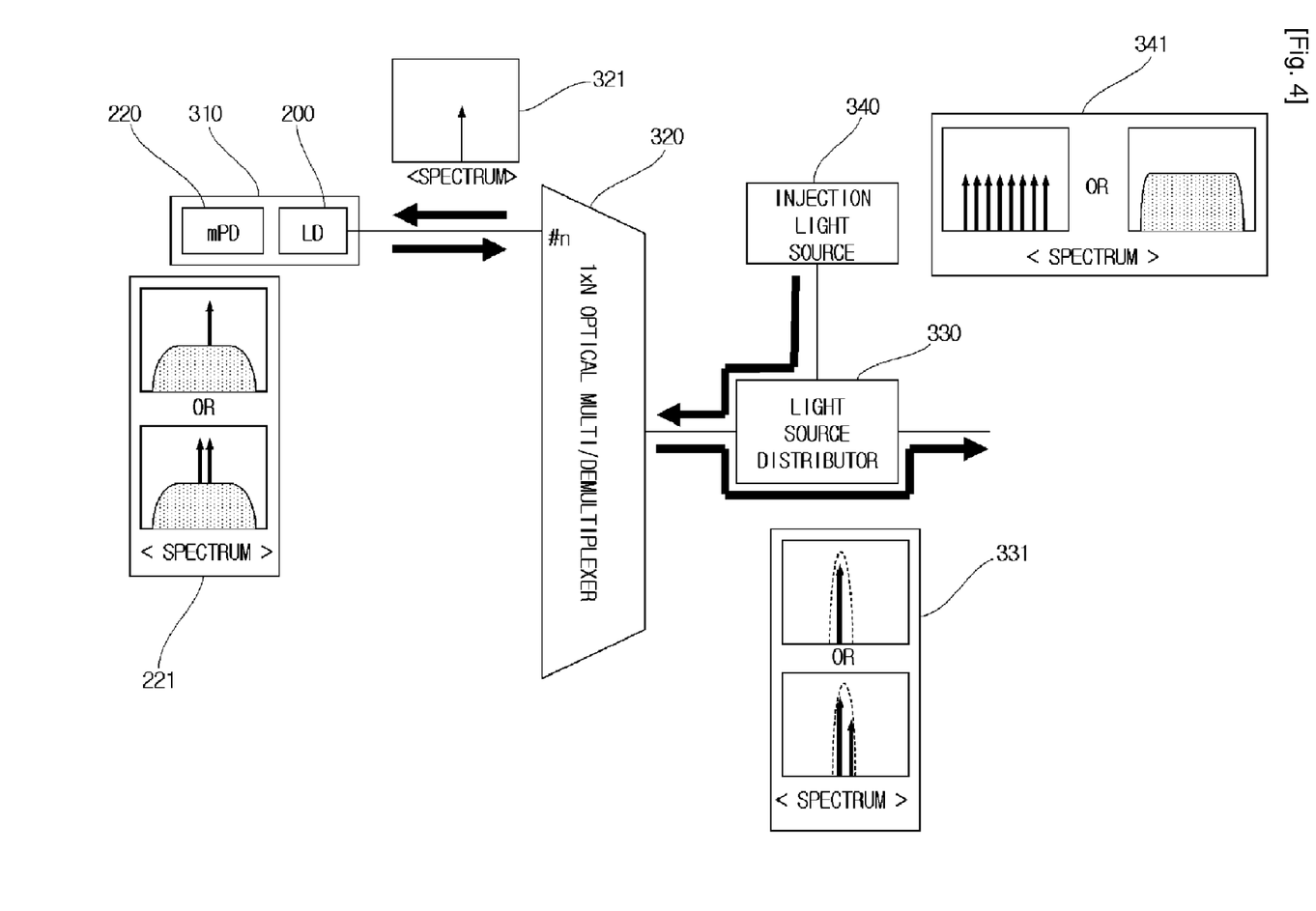
FIG. 4 depicts a WDM-PON implemented by using a conventional optical transmitter in which the driving current is controlled in accordance with the prior art.

FIG. 4 depicts a WDM-PON implemented by using a conventional optical transmitter in which the driving current is controlled according to the prior art.

The optical transmitter 310 includes a laser diode 200 and a monitoring photo diode mPD 220. The optical transmitter 310 receives an injection light from a 1×N optical multiplexer/demultiplexer 320, generates a wavelength-locked optical signal by using the received injection light, and transmits it back to the 1×N optical multiplexer/demultiplexer 320.

The laser diode LD 200 generates an optical signal according to a driving current applied by a driving circuit (not shown) to transmit most of the optical signal to the 1×N optical multiplexer/demultiplexer 320 through the front facet thereof and a very small amount of the optical signal to the monitoring photo diode mPD 220 through the back facet thereof.

The monitoring photo diode mPD 220 receives the optical signal outputted from the back facet of the laser diode LD 200, converts the optical signal into the monitoring current Im and then transmit the monitoring current Im to the driving circuit (not shown). The driving circuit calculates the value of the driving current that needs to be applied to the laser diode LD 200 based on the monitoring current Im.

The 1×N optical multiplexer/demultiplexer 320 divides the injection light received from a light source distributor 330 according to the wavelength thereof and then injects the divided injection light to the optical transmitter 310. Moreover, the 1×N optical multiplexer/demultiplexer 320 performs band-pass filtering on each of the wavelength-divided optical signals received from the transmitter 310 to transmit it to the light source distributor 330.

Thus, the driving current to be applied to the laser diode LD 200 has been controlled based on the optical signal outputted from the back facet of the laser diode LD 200 in accordance with the conventional WDM-PON system.

However, the optical signal received by the monitoring photo diode mPD 220 has wavelength bands corresponding to each subscriber and the residual wavelength bands not corresponding to each subscriber. In contrast to this, the optical signal that is received by the optical receiver located in the subscribers side only has the wavelength bands corresponding to each subscriber as depicted in a spectrum 331 since the optical signal is filtered according to the wavelengths thereof by the 1×N optical multiplexer/demultiplexer 320.

Therefore, in accordance with the conventional driving current control system, there have been difficulties in performing precise control of the driving current since the spectrum 331 of the optical signal received by the receiver (not shown) in the subscribers side is not identical to a spectrum 221 of the optical signal serving as a basis for the control of the driving current. Moreover, this discrepancy between the spectrums 221 and 331 occurs very differently depending on the temperature, the intensity of the injection light source and the characteristics of the laser diode LD. Thus, this causes a deterioration of a system performance in the WDM-PON since the implementation of the APC function and the AEC function available in the other optical transmission system cannot be completely achieved.

DISCLOSURE OF INVENTION

Technical Problem

To solve the above-mentioned problems, the present disclosure provides a driving current control method and system for use in a WDM-PON, capable of controlling a driving current of an optical transmitter based on an optical signal actually received by an optical receiver.

Technical Solution

In accordance with a first aspect of the present invention, there is provided a driving current control method of an optical transmitter for use in a WDM-PON (wavelength division multiplexed-passive optical network), including: setting an attenuation value of a variable optical attenuator to X; detecting an optical power Px received by a monitoring photo diode of the optical transmitter; setting an attenuation value of the variable optical attenuator to Y; detecting an optical power Py received by the monitoring photo diode of the optical transmitter; calculating an optical power Pout of an optical signal outputted from a common terminal of a 1×N optical multiplexer/demultiplexer based on the detected optical power Px and Py; and controlling a driving current based on the calculated optical power Pout.

In accordance with a second aspect of the present invention, there is provided a driving current control system of an optical transmitter for use in a WDM-PON (wavelength division multiplexed-passive optical network), including: a plurality of laser diodes, each laser diode generating and transmitting a transmittance optical signal based on a driving current; an optical multiplexer/demultiplexer for including a plurality of individual terminals and a single common terminal, each individual terminal being connected to one of the plurality of the laser diodes, respectively; a photo diode for receiving an optical signal from one of the plurality of the individual terminals to generate a monitoring current; a variable optical attenuator for attenuating an optical power of an inputted optical signal to output the attenuated optical signal; a controller for controlling an attenuation value of the variable optical attenuator, calculating an optical power of an optical signal outputted from the common terminal based on the monitoring current, and controlling the driving current based on the calculated optical power.

In the second aspect of the present invention, the controller sets the attenuation value to X to detect an optical power Px based on the monitoring current, sets the attenuation value to Y to detect an optical power Py based on the monitoring current, and calculates an optical power Pout of the optical signal outputted from the common terminal based on the detected optical power Px and Py.

BRIEF DESCRIPTION OF THE DRAWINGS

The disclosure may be best understood by reference to the following description taken in conjunction with the following figures.

MODE FOR THE INVENTION

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Figure 5:
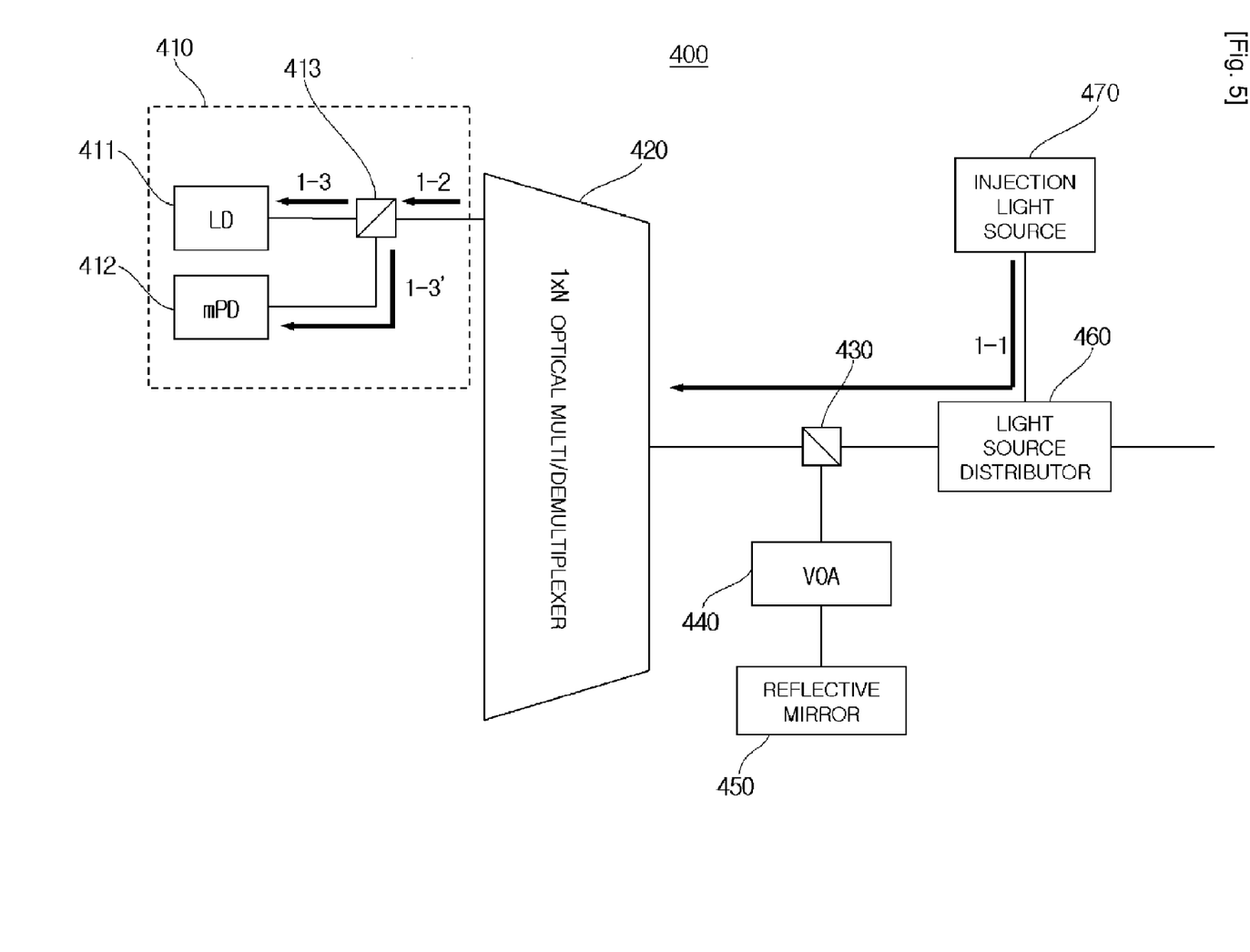
FIG. 5 illustrates a driving current control system of an optical transmitter for use in a WDM-PON in accordance with an embodiment of the present invention.

FIG. 5 illustrates a driving current control system of an optical transmitter for use in a WDM-PON in accordance with an embodiment of the present invention, and particularly illustrates an optical path along which an injection light is transmitted to an optical transmitter.

The driving current control system of the optical transmitter in the WDM-PON in accordance with the embodiment of the present invention includes an optical transmitter 410, a 1×N optical multiplexer/demultiplexer 420, a first power splitter 430, a VOA (variable optical attenuator) 440, a reflective mirror 450, a light source distributor 460 and an injection light source 470.

The injection light source 470 generates an injection light 1-1 and transmits the generated injection light 1-1 to the light source distributor 460. An incoherent light source is mainly used as the injection light source 470.

The light source distributor 460 receives the injection light 1-1 from the injection light source 470, and transmits the received injection light 1-1 to the 1×N optical multiplexer/demultiplexer 420 via the first power splitter 430.

The 1×N optical multiplexer/demultiplexer 420 receives the injection light 1-1 from the light source distributor 460. The 1×N optical multiplexer/demultiplexer 420 includes a plurality of individual terminals, each of which is connected with each of N units of the optical transmitters 410, and a common terminal connected with the first power splitter 430.

The 1×N optical multiplexer/demultiplexer 420 divides the received injection light 1-1 according to wavelength, and then transmits the received injection light 1-1 to the optical transmitter 410 through the individual terminal thereof. For example, an arrayed waveguide grating (AWG) may be used as the 1×N optical multiplexer/demultiplexer 420.

The optical transmitter 410 in accordance with the embodiment of the present invention includes a laser diode LD 411, a monitoring photo diode mPD 412 and a second power splitter 413.

The second power splitter 413 receives the injection light 1-1 from the individual terminal to transmit a portion of the injection light 1-3 to the laser diode LD 411 and the rest portion of the injection light 1-3 to the monitoring photo diode mPD 412.

The laser diode LD 411 receives the injection light 1-3 from the second power splitter 413 and generates a wavelength-locked optical signal according to a driving current applied thereto.

Figure 6:
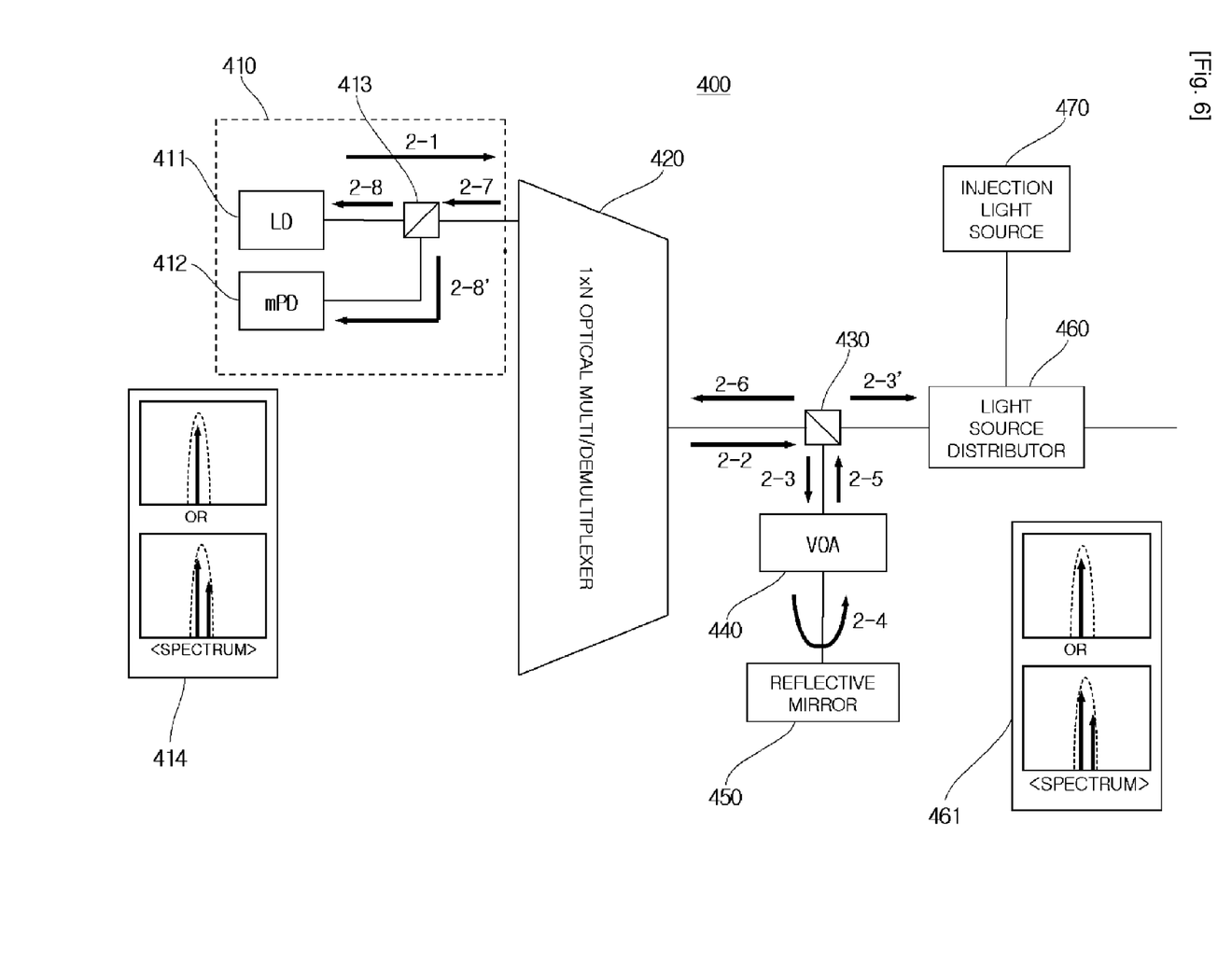
FIG. 6 illustrates the driving current control system of the optical transmitter for use in the WDM-PON in accordance with the embodiment of the present invention.

FIG. 6 illustrates the driving current control system of the optical transmitter for use in the WDM-PON in accordance with the embodiment of the present invention, and particularly illustrates an optical path of a monitoring optical signal to be used to control a driving current.

The optical transmitter 410 generates the wavelength-locked optical signal 2-1 to transmit the generated optical signal 2-1 to the 1×N optical multiplexer/demultiplexer 420.

Specifically, the laser diode LD 411 receives the injection light from the injection light source 470; generates the wavelength-locked optical signal 2-1 according to a driving current; and then transmits the wavelength-locked optical signal 2-1 to the 1×N optical multiplexer/demultiplexer 420.

The 1×N optical multiplexer/demultiplexer 420 receives the wavelength-locked optical signal 2-1 from the laser diode LD 411 through one of the individual terminals thereof, and then performs a band-pass filtering on the optical signal 2-1 according to each wavelength to transmit the filtered optical signal 2-2 to the first power splitter 430 through the common terminal.

The optical signal 2-2 thus outputted from the common terminal of the 1×N optical multiplexer/demultiplexer 420 only has wavelength bands corresponding to each subscriber as shown in spectrum 461 since the optical signal 2-2 is filtered by performing a band-pass filtering thereon according to each wavelength by the 1×N optical multiplexer/demultiplexer 420.

The first power splitter 430 receives the optical signal 2-2 from the common terminal of the 1×N optical multiplexer/demultiplexer 420 to transmit a portion of the received optical signal 2-3 to the variable optical attenuator 440 and the rest portion of the received optical signal 2-3' to the light source distributor 460.

The VOA 440 receives the optical signal 2-3 from the first power splitter 430 and then attenuates an optical power of the received optical signal 2-3. In other words, the VOA 440 attenuates the optical power of the received optical signal 2-3 based on a control signal. Here, the attenuated optical power may be expressed by using decibel dB. At this time, the attenuated optical power is expressed as $-10\log_{10}(X)$[dB]. That is, in the case of 1/10 attenuation, the attenuated optical power is expressed as $-10\log_{10}(1/10)=10$ dB. The VOA 440 attenuates the optical power of the received optical signal 2-3 and then transmits the attenuated optical signal 2-4 to the reflective mirror 450.

The reflective minor 450 reflects the optical signal 2-4 transmitted from the VOA 440. The optical signal 2-4 reflected by the reflective mirror 450 is transmitted back to the optical transmitter 410 via the variable optical attenuator 440, the first power splitter 430 and the 1×N optical multiplexer/demultiplexer 420 in sequence.

The second power splitter 413 receives the optical signal 2-7 from one of the individual terminals of the 1×N optical multiplexer/demultiplexer 420 and then transmits a portion of the optical signal 2-8 to the laser diode LD 411 and the rest portion of the optical signal 2-8 to the monitoring photo diode mPD 412.

The monitoring photo diode mPD 412 receives the optical signal 2-8 from the second power splitter 413 and then converts the optical signal 2-8 to a monitoring current Im to transmit the monitoring current Im to a driving circuit (not shown). The driving circuit (not shown) calculates a driving current to be applied to the laser diode LD 412 based on the monitoring current Im.

A spectrum 414 of the optical signal 2-8 received by the monitoring photo diode mPD 412 is similar to the spectrum 461 of the optical signal 2-2 outputted from the common terminal of the 1×N optical multiplexer/demultiplexer 420.

Therefore, the optical path of the monitoring optical signal which is used for controlling the driving current of the laser diode LD 411 is summarized as follows:

(1) The transmittance optical signal 2-1 generated by the laser diode LD 411 is transmitted to the 1×N optical multiplexer/demultiplexer 420.

(2) The optical signal 2-1 transmitted to the 1×N optical multiplexer/demultiplexer 420 is transmitted to the first power splitter 430 after the band-pass filtering is performed on the optical signal 2-1 according to each wavelength.

(3) The optical signal 2-2 transmitted to the first power splitter 430 is divided, and then a portion of the optical signal 2-3 is transmitted to the VOA 440.

(4) The optical power of the optical signal 2-3 transmitted to the VOA 440 is attenuated, and then the optical signal 2-3 is transmitted to the reflective minor 450.

(5) The optical signal 2-4 transmitted to the reflective mirror 450 is reflected by the reflective mirror 450.

(6) The optical signal 2-4 reflected by the reflective mirror 450 is transmitted back to the 1×N optical multiplexer/demultiplexer 420 via the VOA 440 and the first power splitter 430.

(6) The optical signal 2-6 transmitted to the 1×N optical multiplexer/demultiplexer 420 is transmitted to the second power splitter 413 after the band-pass filtering is performed on the optical signal 2-6 according to each wavelength.

(7) The optical signal 2-7 transmitted to the second power splitter 413 is divided, and then a portion of the optical signal 2-8 is transmitted to the monitoring photo diode mPD 412. The optical signal 2-8 transmitted to the monitoring photo diode mPD 412 is used to control the driving current of the laser diode 411.

Figure 7:
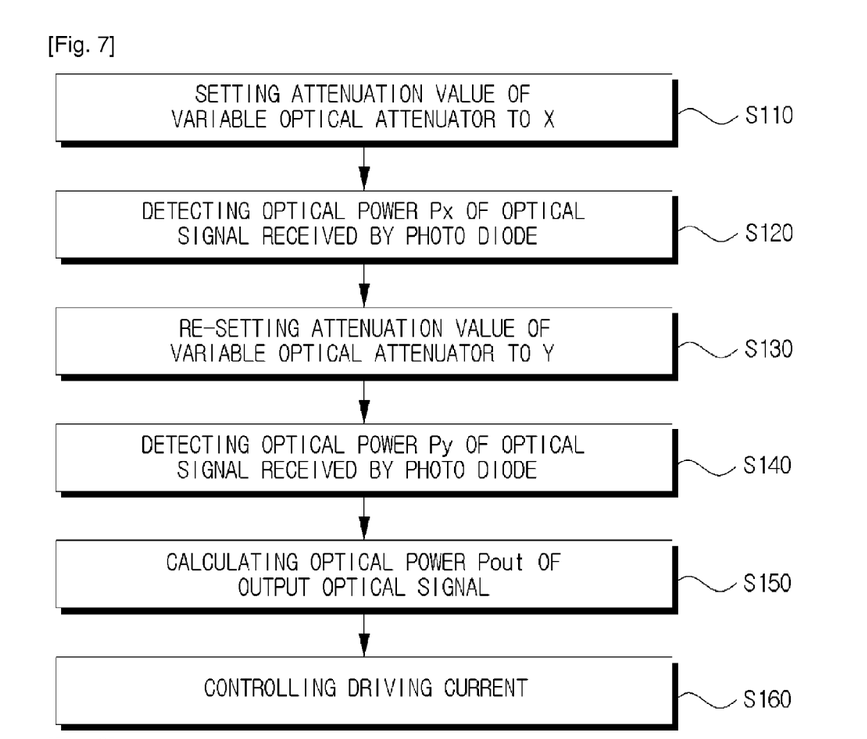
FIG. 7 is a flowchart that illustrates a method for calculating an optical power of an optical signal outputted from a common terminal of a 1×N optical multiplexer/demultiplexer and for controlling a driving current of an optical transmitter based on the calculated optical power in a WDM-PON in accordance with the embodiment of the present invention.

FIG. 7 is a flowchart that illustrates a method for calculating the optical power of an optical signal outputted from the common terminal of the 1×N optical multiplexer/demultiplexer and controlling a driving current of an optical transmitter based on the calculated optical power in a WDM-PON in accordance with the embodiment of the present invention.

Hereinafter, with reference to FIG. 5 to FIG. 7, a method for calculating the optical power of the optical signal outputted from the common terminal of the 1×N optical multiplexer/demultiplexer 420 and controlling the driving current of the laser diode LD 411 based on the calculated optical power will be explained.

At step S110, an optical power Pout of the optical signal outputted from the common terminal of the 1×N optical multiplexer/demultiplexer 420 is attenuated by an attenuation value X. Step S110 may be performed by transmitting a control signal to the VOA 440 so as to make the attenuation value of the optical power by the VOA 440 to be X.

At Step S120, an optical power Px of the optical signals 1-3 and 2-8 transmitted to the monitoring photo diode mPD 412 is detected. The detection of the optical power Px may be performed by converting the transmitted optical signal to an electrical signal.

The optical power Px detected at step S120 is the sum of the optical power Pinj of the optical signal 1-3 generated by the injection light source and the optical power of the optical signal 2-8 reflected by the reflective minor 450.

In this case, a relationship between Px, Pinj, Pout and X can be expressed by using following formula 1.

$$Px = Pinj + Pout \times loss \times X$$ [Formula 1]

In formula 1, Px is the optical power of all optical signals 1-3 and 2-8 received by the monitoring photo diode mPD 412; Pinj is the optical power of the injection light 1-3 generated by the injection light source and injected to the monitoring photo diode mPD 412; Pout is the optical power of the optical signal outputted from the common terminal of the 1×N optical multiplexer/demultiplexer 420; and loss represents an optical power loss incurred on an optical path along which the optical signal outputted from the common terminal of the 1×N optical multiplexer/demultiplexer 420 passes the first power splitter 430, the reflective minor 450, the first power splitter 430, the 1×N optical multiplexer/demultiplexer 420 and the second optical splitter 413. The loss is a constant value. Further, X is the attenuated value of the optical power of the optical signal outputted from the common terminal of the 1×N optical multiplexer/demultiplexer 420 and attenuated by the VOA 440. Thus, Pout×loss×X means the optical power of the optical signal 2-8 reflected by the reflective mirror 450 and received by the monitoring photo diode mPD 412.

At step S130, an optical power Pout of the optical signal outputted from the common terminal of the 1×N optical multiplexer/demultiplexer 420 is attenuated by an attenuation value Y. As described above, step S130 may be performed by transmitting a control signal to the VOA 440 so as to make the attenuation value of the optical power by the VOA 440 to be Y.

At step S140, an optical power Py of the optical signal 1-3 and 2-8 transmitted to the monitoring photo diode mPD 412 is detected again. The detection of the optical power Py may be performed by converting the transmitted optical signal to an electrical signal.

The optical power Py detected at step S140 is the sum of the optical power Pinj of the optical signal 1-3 generated by the injection light source and the optical power of the optical signal 2-8 reflected by the reflective minor 450.

In this case, a relationship between Py, Pinj, Pout and Y can be expressed by using following formula 2

$$Py = Pinj + Pout \times loss \times Y$$ [Formula 2]

In formula 2, Y is the attenuated value of the optical power of the optical signal outputted to the common terminal of the 1×N optical multiplexer/demultiplexer 420 and attenuated by the VOA 440. The other terms are the same as those in formula 1 and detailed explanations of them will be omitted.

At step S150, the optical power Pout of the optical signal outputted from the common terminal of the 1×N optical multiplexer/demultiplexer is calculated by using the optical power Px and Py detected at step S120 and S140, respectively. The optical power Pout may be calculated by using following formula 3.

$$Pout = (Px - Py) \div [loss \times (X Y)]$$ [Formula 3]

In formula 3, X and Y are the attenuated values that may be controlled by the control signals, and Px and Py is the value detected at step S120 and S140, respectively. loss is a constant value due to the optical loss incurred on the optical path. Thus, the optical power Pout of the optical signal outputted from the common terminal of the 1×N optical multiplexer/demultiplexer 420 can be calculated by the formula 3.

At step S160, the driving current of the laser diode LD is controlled based on the optical power Pout calculated at step S150.

Although the embodiment of the present invention has been described with respect to a case where the variable optical attenuator 440 is located between the first power splitter 430 and the reflective minor 450 with reference to FIG. 5 to FIG. 7, this case is only example and the present invention is not necessarily limited to this case. For example, the variable optical attenuator 440 may be located between the injection light source 470 and the light source distributor 460.

The formula 1 to formula 3 may be changed depending on the location of the variable optical attenuator 440. However, a person skilled in the art may easily understand that it is possible to calculate the optical power Pout of the optical signal outputted from the common terminal of the 1×N optical multiplexer/demultiplexer 420 even in other cases that the variable optical attenuator 440 is located somewhere else so long as a formula can be made in a form of a 2-dimensional linear equation, such as the formula 1 to 3.

As described above, the driving current control system in accordance with the embodiment of the present invention controls the driving current of the optical transmitter based on the optical signal filtered by the 1×N optical multiplexer/demultiplexer 420 according to corresponding wavelength. The optical signal thus filtered according to each wavelength has a similar spectrum to that of the optical signal received by a receiver (not shown). Therefore, the driving current control system in accordance with the embodiment of the present invention may control the driving current of the optical transmitter based on the spectrum which is similar to that of the optical signal actually received by each subscriber.

Figure 8:
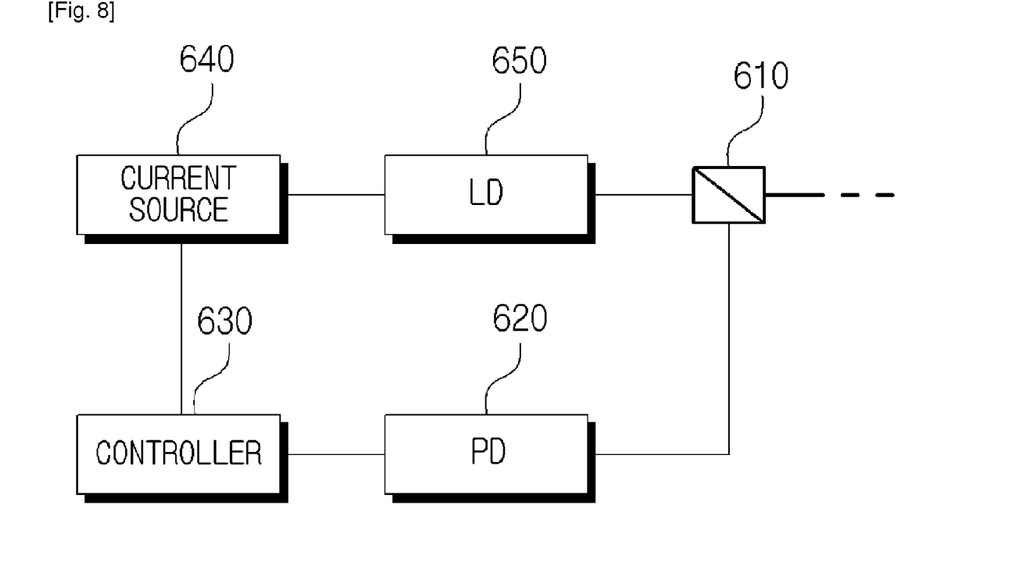
FIG. 8 depicts a detailed configuration of the optical transmitter in accordance with the embodiment of the present invention.

FIG. 8 depicts a detailed configuration of the optical transmitter in accordance with the embodiment of the present invention.

The optical transmitter in accordance with the embodiment of the present invention includes a power splitter 610, a photo diode PD 620, a controller 630, a current source 640 and a laser diode LD 650.

The power splitter 610 receives an optical signal from a 1×N optical multiplexer/demultiplexer (not shown). The power splitter 610 divides the received optical signal to transmit a portion of the optical signal to the laser diode LD 650 and the rest portion of the optical signal to the photo diode PD 620.

The photo diode PD 620 receives the optical signal from the power splitter 610 and converts the received optical signal into an electrical signal. The photo diode PD 620 transmits the converted electrical signal to the controller 630.

After setting an attenuation value of a variable optical attenuator (not shown) to X, the controller 630 receives the electrical signal from the photo diode PD 620. Subsequently, after setting an attenuation value of the variable optical attenuator (not shown) to Y, the controller 630 receives the electrical signal again from the photo diode PD 620. The controller 630 receives the electrical signals from the photo diode PD 620 through two processes, and then calculates the optical power of the optical signal outputted from the common terminal of the 1×N optical multiplexer/demultiplexer (not shown) based on the received electrical signals to control the current source 640 based on the calculated optical power.

The controller 630 performs an APC function and an AEC function by adjusting the driving current, i.e., the bias current and the modulation current until an average power and an extinction ratio ER of the optical signal fall within a desired range.

The current source 640 applies the driving current controlled by the controller 630 to the laser diode LD 650. The value of the driving current supplied by the current source 640 is determined based on the optical power calculated by the controller 630 as described above.

The laser diode LD 650 generates a transmittance optical signal according to the applied driving current, and transmits the generated optical signal to the 1×N optical multiplexer/demultiplexer (not shown) via the power splitter 610. The optical power of the optical signal generated by the laser diode LD 650 is proportional to the value of the driving current applied to the laser diode LD 650 by the current source 640.

As described above, the controller 630 of the optical transmitter in accordance with the embodiment of the present invention can control the driving current to be applied to the laser diode LD 650 based on the optical signal outputted from the common terminal of the 1×N optical multiplexer/demultiplexer (not shown).

That is, the driving current control system of the optical transmitter in accordance with the embodiment of the present invention can control the driving current based on the optical signal filtered by the 1×N optical multiplexer/demultiplexer (not shown) and outputted from the common terminal thereof without using the optical signal outputted from the back facet of the laser diode LD 650, which has been used in the prior art.

The above-described embodiments of the present invention are illustrated and explained by considering only components for transmitting the optical signal for the simplicity of explanation. Such configuration for the transmission of the optical signal may be applied to a case that the center station transmits the downstream optical signal to each subscriber, as well as a case that each subscriber transmits the upstream optical signal to the center station.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

INDUSTRIAL APPLICABILITY

In accordance with the embodiments of the present invention, there is a beneficial effect that accurate data can be transmitted regardless of the variation of surrounding environment by controlling the driving current of the optical transmitter based on the spectrum of the optical signal, which is similar to the spectrum actually received by the optical transmitter, instead of the spectrum of the optical signal outputted from the back facet of the laser diode.

The invention claimed is:

1. A driving current control method of an optical transmitter for use in a WDM-PON (wavelength division multiplexed-passive optical network), comprising:
    setting an attenuation value of a variable optical attenuator to X;
    detecting an optical power Px received by a monitoring photo diode of the optical transmitter;
    setting an attenuation value of the variable optical attenuator to Y;
    detecting an optical power Py received by the monitoring photo diode of the optical transmitter;
    calculating an optical power Pout of an optical signal outputted from a common terminal of a 1×N optical multiplexer/demultiplexer based on the detected optical powers Px and Py; and
    controlling a driving current based on the calculated optical power Pout.

2. The driving current control method of claim 1, wherein the optical power Pout is calculated by using a below formula, $$Pout=(Px-Py)\div[loss\times(XY)]$$

and loss is an optical power loss incurred on an optical path.

3. A driving current control system of an optical transmitter for use in a WDM-PON, comprising:
    a plurality of laser diodes, each laser diode generating and transmitting a transmittance optical signal based on a driving current;

an optical multiplexer/demultiplexer including a plurality of individual terminals and a single common terminal, each individual terminal being connected to one of the plurality of the laser diodes, respectively;

a photo diode for receiving an optical signal from one of the plurality of the individual terminals to generate a monitoring current;

a variable optical attenuator for attenuating an optical power of an inputted optical signal to output an attenuated optical signal;

a controller for controlling an attenuation value of the variable optical attenuator, calculating an optical power of an optical signal outputted from the common terminal based on the monitoring current, and controlling the driving current based on the calculated optical power.

4. The driving current control system of claim 3, wherein the controller sets the attenuation value to X to detect an optical power Px based on the monitoring current, sets the attenuation value to Y to detect an optical power Py based on the monitoring current, and calculates an optical power Pout of the optical signal outputted from the common terminal based on the detected optical powers Px and Py.

5. The driving current control system of claim 3, wherein the controller adjusts the driving current until an average power and an extinction ratio ER of the optical signal outputted from the common terminal fall within a predetermined range.

6. The driving current control system of claim 3, further comprising:
    a first power splitter for receiving the optical signal from the common terminal and dividing the received optical signal according to a pre-determined ratio; and
    a reflective minor for reflecting the optical signal divided by the first power splitter and transmitting the reflected optical signal to the optical multiplexer/demultiplexer via the first power splitter.

7. The driving current control system of claim 6, further comprising a second power splitter, located between the optical multiplexer/demultiplexer and the laser diodes, for transmitting a portion of the optical signal reflected by the reflective mirror to the photo diode.

8. The driving current control system of claim 6, wherein the variable optical attenuator is located between the power splitter and the reflective mirror.

* * * * *